United States Patent Office 2,896,598
Patented July 28, 1959

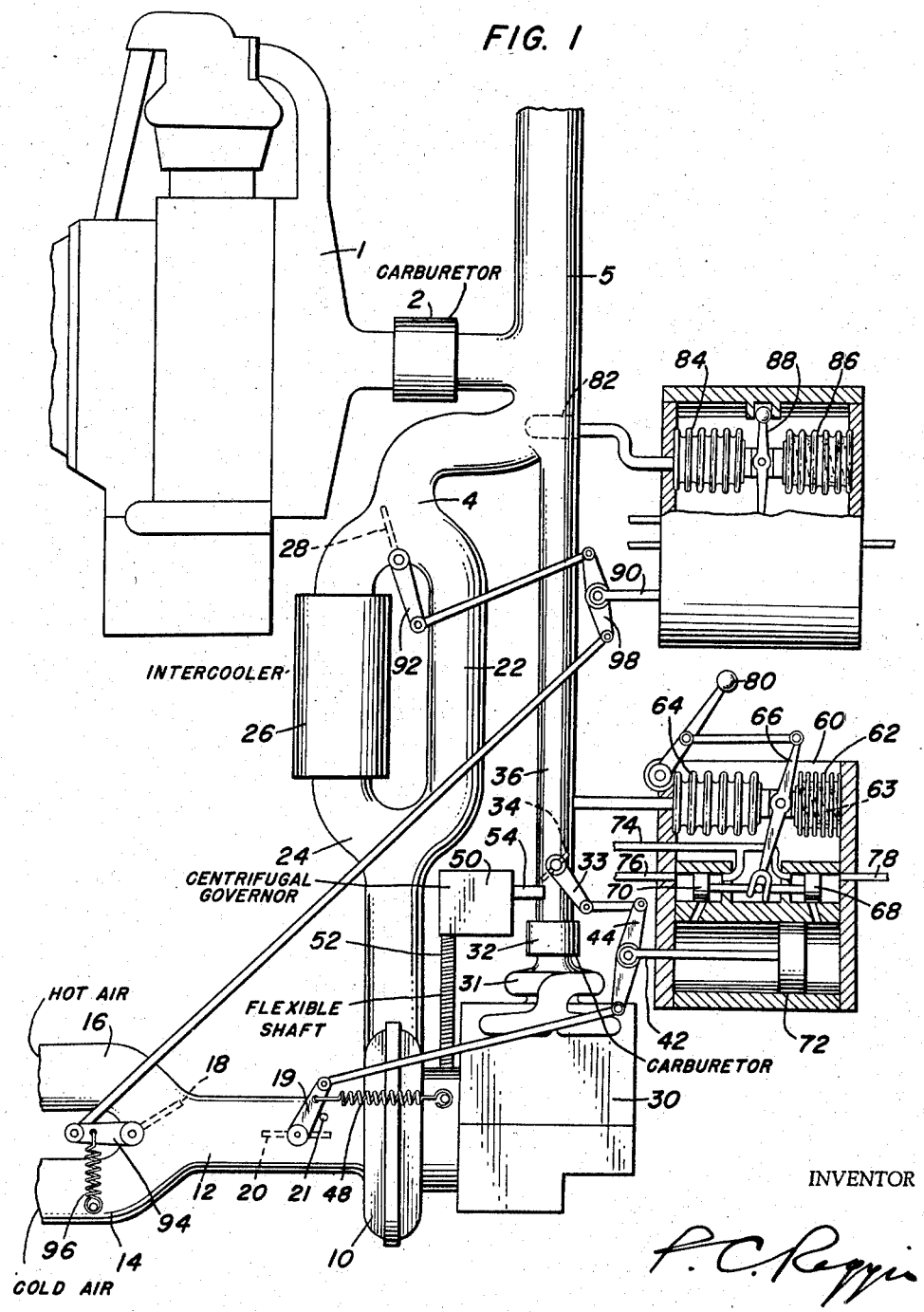

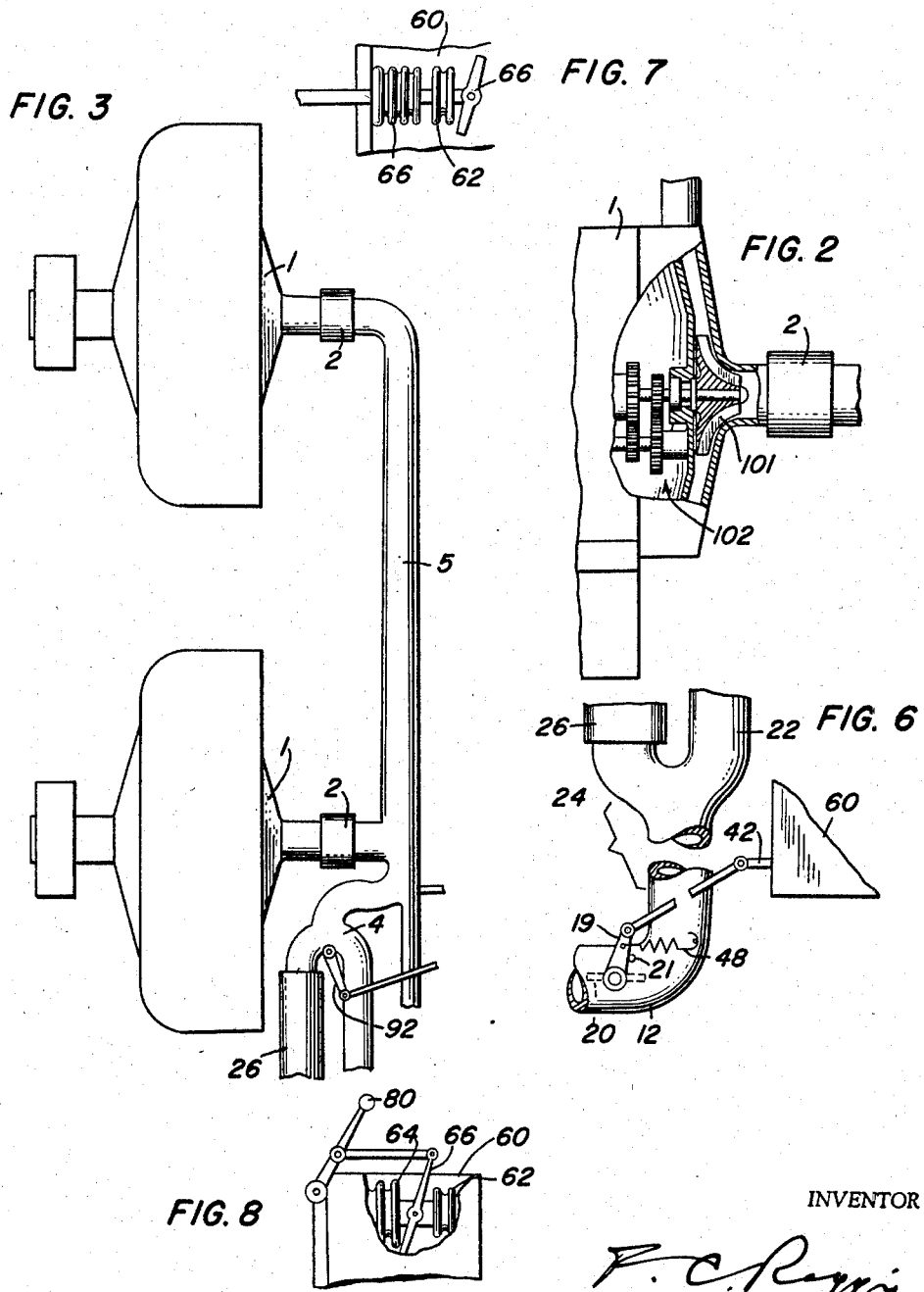

2,896,598

ENGINE AIR INDUCTION CONTROL APPARATUS

Ferdinando Carlo Reggio, Norwalk, Conn.

Application December 29, 1951, Serial No. 264,146, which is a division of application Serial No. 772,806, September 8, 1947, now Patent No. 2,581,334, dated January 1, 1952, which is in turn a division of application Serial No. 443,109, May 15, 1942, now Patent No. 2,516,911, dated August 1, 1950. Divided and this application May 11, 1954, Serial No. 429,097

8 Claims. (Cl. 123—119)

This invention relates to combustion engines or thermal power plants and more particularly to devices for regulating the operation of said power plants, or the air supply thereof, and apparatus for controlling the operation of gas turbines, superchargers, air compressors and similar devices connected with or forming part of the power plant. The invention is particularly useful in connection with powerplants, engines or prime movers which are subject to considerable changes in the surrounding or operating conditions such as barometric pressure, atmospheric temperature, ram pressure due to forward motion, engine temperature level and engine load.

The present application is a division of my application Serial No. 264,146 filed December 29, 1951, which is a division of application Serial No. 772,806 filed September 8, 1947, now Patent No. 2,581,334 issued January 1, 1952, which is in turn a division of application Serial No. 443,109 filed May 15, 1942, now Patent No. 2,516,911 issued August 1, 1950.

A general object of the invention is to provide improved apparatus for automatically controlling turbo-superchargers, air compressors, gas turbines, throttle valves and similar devices and auxiliary motors therefor connected with the air intake system, the combustion system or the exhaust system of power plants.

Another object of the invention is to provide means for automatically and efficiently regulating the pressure or density of the air or combustible mixture supplied to an air-consuming power plant.

Another object is to provide improved power plants including a plurality of main engines having common air induction systems and control systems.

Another object is to provide improved control devices for gas turbines and the like.

A further object is to provide improved components or sub-assemblies for such control systems.

Further and other objects and advantages will be apparent from the description, in conenction with which several embodiments of the invention have been illustrated in the accompanying drawings, in which:

Figure 1 is a diagrammatic view of an engine in connection with a supercharger unit and automatic pressure and temperature regulators therefor.

Figure 2 is a fragmentary longitudinal sectional elevation of a modified construction wherein the engine comprises a second supercharger.

Figure 3 is a diagrammatic partial view of a modified arrangement including a plurality of engines.

Figure 6 is a further modification of Figure 1.

Figure 7 is a modification of the pressure responsive bellows assembly.

Figure 8 is a further modification of the pressure responsive bellows assembly of Figure 1.

Figure 5:
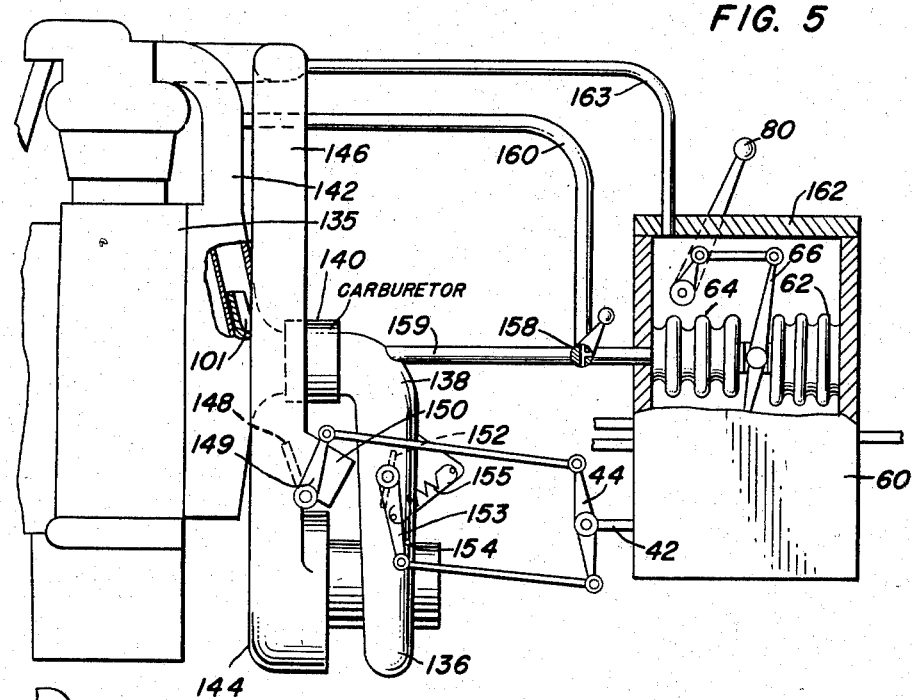
Figure 5 is a diagrammatic view of an automatic regulator in connection with an engine provided with an exhaust-driven turbo-supercharger.

The power output of air-consuming combustion engines, such for example as the conventional carburetor engines or the fuel-injection spark-ignition engines, is predominantly dependent upon the engine air flow. Such flow, and in turn the engine power output, is usually controlled by positioning a throttle valve and/or by regulating the capacity or compression ratio of a compressor or supercharger associated with the air intake system of the engine. One of the objects of the present invention is to provide means for efficiently co-ordinating the positioning of the throttle valve and the control of the supercharger capacity. Thus, in aircraft engines provided with superchargers designed for operation at high altitude, a considerable amount of throttling is required when cruising at low altitude. Under such conditions, according to the invention, means are provided for automatically maintaining the supercharger speed at or near its minimum value, thereby saving energy that would otherwise be wasted if the supercharger were driven at unnecessarily high speed and preventing a corresponding objectionable rise in the temperature of the air flowing to the engine. Moreover, according to the invention, means may be provided for driving the supercharger at an infinite number of speeds, subject to the positioning of the throttle valve, whereby the supercharger capacity is atuomatically adjusted efficiently to fit each altitude and operating condition within the designed limits.

The invention is shown as applied to a conventional radial aircraft engine 1 having a carburetor 2 connected through a conduit 4 with a blower 10. Air is supplied to the blower through a conduit 12 having two branches 14 and 16 for leading cold and hot air respectively thereto. A valve 18 is placed at the junction of conduits 14 and 16 and is pivoted so that it may regulate the ratio of cold to hot air admitted to conduit 12 and thereby regulate the resultant temperature of the air in that conduit. A valve 20 is placed in condui 12 and is adapted to restrict the effective area of that conduit and thereby regulate the pressure at the blower intake.

The conduit 4 has two branches 22 and 24. The latter contains an intercooler, shown generally at 26. A valve 28 is placed at the junction of branches 22 and 24 and is pivoted so that it may regulate the proportion of air flowing through the intercooler and thereby control the temperature in conduit 4. This conduit may extend beyond the engine 1 and form a conduit 5 to supply compressed air to one or more other engines, as shown in Figure 3.

The blower 10 is driven by an independent or self-contained motor. Although any type of variable-speed motor may be used, one among its preferred forms is disclosed in Figure 1 as an internal combustion motor 30 having a carburetor 32 to which air is supplied from conduit 4 through a duct 36 in which is placed a throttle valve 34. A conventional supercharger 31, driven by means of gears by the motor 30, is mounted between the carburetor 32 and the cylinders of the motor.

An idling speed governor, indicated generally at 50, prevents the motor 30 from stalling. In the preferred embodiment it consists of a centrifugal type governor, driven from the motor 30 through the flexible shaft 52, and controlling the position of an axially slidable rod 54 which, in turn, limits the clockwise rotation of lever 33 and thereby prevents the throttle valve 34 from restricting the effective area of duct 36 below the value corresponding, for each value of the pressure in the duct 36, to the idling speed of motor 30.

The governor 50 is so designed that its energy is substantially greater than the energy of a spring 48 one end of which is secured to the lever 19 controlling the valve 20. The spring 48, cooperating with a stop 21, tends to maintain the valve 20 in open position.

A floating lever 44 is mounted at its median point, by means of a pivot, on an axially slidable rod 42 and its upper and lower ends are connected by means of suitable links with levers 33 and 19 respectively.

In the operation of the above described mechanism the pressure in conduits 36 and 4 is controlled by the axial displacement of the rod 42. Assuming said rod 42 to be initially in its extreme right position, both the valve 20 and the throttle valve 34 will be entirely open, whereby for a given value of the surrounding air density the motor 30 runs at maximum speed, the air pressure in conduit 4 attains its maximum value and the engine 1 develops its maximum power output.

If now the rod 42 is displaced toward the left, while owing to the action of spring 48 the valve 20 remains in open position, the throttle valve 34 is caused to rotate so as to restrict the effective area of the conduit 36 and thereby reduce the speed of motor 30 and blower 10 and in turn reduce the value of the pressure in conduit 4 and the power output of the engine 1. Continued displacement of the rod 42 in the same direction will cause the speed of motor 30 to be further reduced until the rotation of valve 34 is stopped by the rod 54 operated by the governor 50. The motor 30 will then operate at idling speed, and the pressure in conduit 4 will be practically equal to the surrounding atmospheric pressure. Thereafter, upon continued displacement of the rod 42, the resistance opposed by the governor 50 to further rotation of valve 34 being substantially greater than the resistance opposed by the spring 48 to the rotation of lever 19, while the motor 30 is maintained at idling speed, the floating lever 44 will overcome the spring 48 and operate to progressively close the valve 20 and thereby reduce the pressure in conduit 4 to such a low value as may be required for idling speed of engine 1. Obviously, when the rod 42 is displaced in the opposite direction back to its initial position, first the valve 20 will be opened while the motor 30 is idling, and thereafter the speed of the motor 30 will be increased to its maximum value corresponding again to the maximum power output of the engine 1.

In the foregoing description the blower 10 has been assumed to be of the centrifugal type. Although the above mentioned type is particularly advantageous in the present system, it is to be understood that the invention is not limited thereto but that various other known types of blower or compressor may be employed.

It is to be noted that the engine 1 indicated diagrammatically in Figure 1 may include an additional blower 101 as shown in Figure 2, driven by means of gears 102 from the engine 1 and inserted between the carburetor or charge forming device 2 and the engine cylinders, or connected with the latter in any suitable manner.

A pressure regulator, indicated generally by numeral 60, is provided to operate the rod 42. The pressure regulator may be any device capable of displacing the rod 42 in response to a change in the pressure inside the duct 36. In the embodiment shown this regulator includes a metallic bellows 62 sealed under total or partial vacuum and provided with a spring 63 adapted to expand said bellows. This bellows acts directly against a similar bellows 64 connected with the duct 36 by a pipe. These two bellows act on a floating lever 66 to operate the valves 68 and 70 which control the admission of a fluid under pressure to opposite sides of piston 72 which in turn operates the rod 42. The fluid under pressure, usually lubricating oil from an engine driven pump, is led into the pipe 74 and returns to the engine crankcase or other reservoir through conduits 76 and 78. The surrounding atmospheric pressure acts on the two bellows in opposite directions so that any change of pressure in the duct 36 operates the bellows 64 and in turn the piston 72 and returns the pressure in duct 36 to the predetermined value, independently of any variation in atmospheric pressure such as that caused by changes in altitude.

A manual control lever 80 adjustable while in flight by the pilot and connected with the upper point of lever 66 is provided, whereby the value of the pressure automatically maintained in duct 36 by the regulator 60 may be controlled. This value of the pressure in ducts 36 and 4 is dependent upon the load of spring 63 mounted within bellows 62, which load is in turn dependent upon the position of control lever 80. In fact, if we assume that the engine 1 operates under steady conditions with lever 80 adjusted in a certain angular position, there corresponds in conduit 4 and within bellows 64 a definite pressure that balances the resilient load of spring 63 plus the eventual resilient loads of bellows 62 and 64 and the pressure within bellows 62 if the same is not completely evacuated; the pilot valve 68, 70 is in neutral position, and the piston 72 of the servo-motor is stationary. If now the pressure in conduits 4 and 36 and within bellows 64 decreases, owing for example to increasing altitude, bellows 64 contracts, moving the pilot valve 68, 70 toward the left, and causing piston 72 to be displaced toward the right, to actuate either throttle valve 34, or throttle valve 20, in a direction to increase the air pressure in conduit 4. Movement of the piston 72 of the servo-motor will continue until the pressure in ducts 4 and 36 and within bellows 64 resumes the initial value corresponding to, or determined by, the position in which control lever 80 is adjusted. Obviously, an increase of pressure in ducts 4 and 36 will set the servo-motor in motion in opposite direction until the pressure therein resumes the initial value determined by the position of the control lever 80.

Conversely, when the pilot desires to vary the pressure in conduit 4, for example to increase this pressure, he rotates the lever 80 clockwise to a new angular position. This will cause at first clockwise rotation of lever 66 about its middle point and displacement of pilot valve 68, 70 to the left, actuating the servo-motor in a direction to increase the pressure in said conduit and within bellows 64. The latter will then gradually expand, compressing spring 63, rotating the lever 66 counter-clockwise about its upper end, and displacing the pilot valve 68—70 to the right. Operation of the servo-motor in a direction to increase the supercharging pressure will continue until the pilot valve 68—70 resumes its neutral position, with the pressure within bellows 64 at higher value, balancing the increased force of the spring 63. In similar manner counter-clockwise rotation of the control lever 80 to a new angular position will cause the air pressure in conduit 4 to be reduced to and maintained at a correspondingly lower value.

It is therefore apparent that for each given position of control member 80 there will correspond a definite constant value of the pressure in duct 4, or in other words, that the value of the pressure in said duct is determined by the position of the control means 80. This, obviously, is true within certain limits of altitude, as beyond such limits the supercharger capacity is exceeded and the pressure controls become at least in part inoperative.

It is to be noted that, for a given position of the manual control 80, the absolute pressure in duct 36 and in conduit 4 will have a constant value within the designed limits of altitude. The power output of engine 1 will increase with the altitude, owing to the corresponding decrease in the exhaust back pressure. Instead of a constant absolute pressure in conduit 4, substantially constant power output of engine 1 at a given speed thereof may however be obtained with a bellows 62 of smaller displacement than bellows 64, as shown in Figure 8. In fact, if bellows 62 and 64 have different diameters, the pressure regulator is responsive not only to the absolute pressure in the conduit 4, but also to the surrounding atmospheric pressure, and automatically maintains in conduit 4 an absolute pressure which varies proportionally with changes in the surrounding atmospheric pressure, the ratio of proportionality depending upon the ratio of the diameters of said bellows. In particular, with a bellows 62 having a smaller diameter than bellows 64, a reduction of surrounding barometric pressure determines a corresponding decrease of absolute pressure in conduit 4, and it is clear that it will be possible to establish the relative dimensions of bellows 62 and 64 in such way that a drop in the surrounding pressure, caused for example by a climb to higher altitude, determines a corresponding reduction of supercharging pressure which substantially compensates the effect upon the engine power output of the drop in exhaust back pressure, thus maintaining the power output of the engine, at a given speed thereof, constant or substantially constant independently of changes in altitude.

Therefore, with bellows 64 and 62 of unequal displacements or unequal effective diameters, the pressure in conduit 4 will be dependent upon both the angular setting of control lever 80 and the altitude, or in other words, will be regulated as a preselected function of the surrounding barometric pressure and of the position of said control means.

Figure 1, considered in combination with Figure 2, illustrates a powerplant arrangement in which air is supplied to the engine 1 by two superchargers 10 and 101 in series, with an intercooler or heat exchanger 26 interposed therebetween, this arrangement being particularly suitable in connection with aircraft powerplants designed for operation at high altitude. When such a powerplant is operating under cruising power at moderate or low altitudes, the blower 10 may become unnecessary, in which case the pressure regulator 60, together with spring 48, will cause the motor 30 to operate at idling speed, with the blower or supercharger 10 rotating at such low speed as to be substantially ineffective. Under these conditions the pressure regulator 60 operates upon the throttle valve 20 exclusively, angularly adjusting said valve automatically to regulate the air pressure in conduit 4 and maintain said pressure at a value dependent upon the adjustment of control lever 80 and, where bellows 62 and 64 have unequal diameters, also dependent upon the pressure surrounding these bellows. Obviously, where steady cruising operation at moderate or low altitude is expected, the motor 30, instead of being kept idling, may be stopped.

In order automatically to maintain the air temperature in conduit 4 at a predetermined value, a temperature regulator is provided, including a temperature responsive element 82 connected with a bellows 84 acting directly against a similar bellows 86. Bellows 86 is sealed under vacuum and is provided with a spring 87 adapted to expand it against the surrounding pressure. These two bellows act on a lever 88 to operate a servo-mechanism similar to that described for the pressure regulator and which it is considered unnecessary again to describe in detail. Temperature changes in conduit 4 will cause a displacement of rod 90 which in turn operates a floating lever 98 whose upper and lower ends control, by means of levers 92 and 94, the valves 28 and 18 respectively. A spring 96 tends to maintain the valve 18 in the position in which cold air only is admitted to the intake of blower 10.

Assuming the temperature of the air at the blower outlet to be equal to the predetermined temperature to be maintained in conduit 4, the valve 28 will be maintained by the regulator in the position shown in Figure 1, in which position no amount of air flows through the intercooler 26. A decrease in the temperature about the element 82 will cause displacement of the rod 90 toward the right and thereby operate the valve 18 to decrease the proportion of cold air and increase the proportion of hot air admitted to the blower intake. Conversely, an increase in the temperature about the element 82 will cause rotation of valve 18 in the opposite direction and thereby decrease the temperature at the blower intake, until valve 18 reaches its extreme position corresponding to admission of cold air only. Thereafter, further increase in the temperature will cause the valve 28 to be rotated so as to admit the necessary amount of air to the intercooler. Obviously the temperature regulator, if provided with bellows 84 and 86 of equal diameters, is unaffected by changes in atmospheric pressure.

Figure 4:
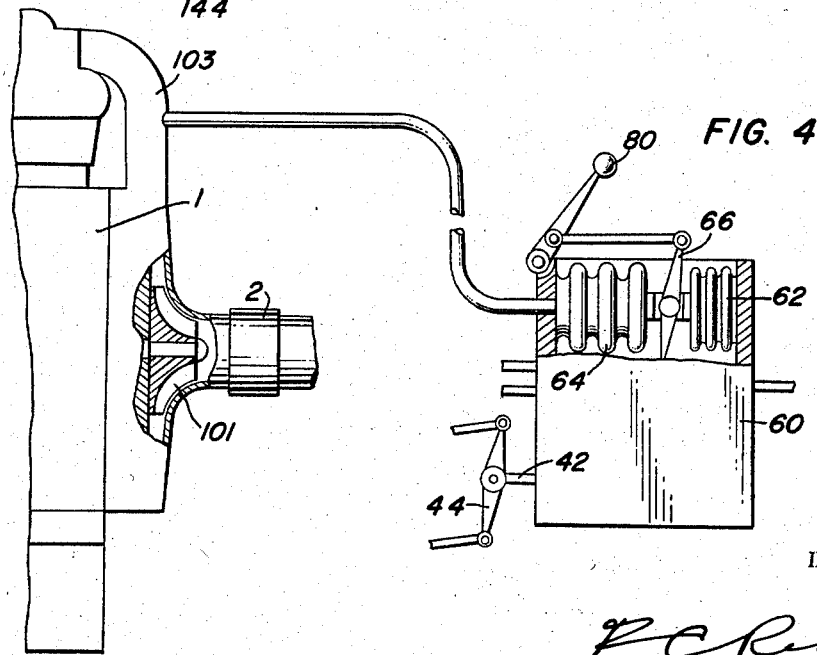
Figure 4 is a modification of Figure 1.

Referring to the arrangement of Figure 1, the regulator 60 controls the pressure in conduit 4 and, if the engine 1 is provided with an additional supercharger, for example a gear-driven conventional supercharger 101 as shown in Figures 2 and 4, then the induction pressure in the engine manifold 103 varies with the engine speed. However, the same pressure regulator 60 may be used to control the pressure at the cylinder inlet ports, independently of the engine speed, by merely disconnecting the bellows 64 thereof from duct 36 and connecting it with engine manifold 103 as indicated in Figure 4, the remaining structure being as already disclosed in connection with Figure 1.

While in the drawing bellows 62 is shown acting upon lever 66 in opposition to bellows 64, it will be understood that according to the invention bellows 62 may be connected with lever 66 in other ways, for example in such a manner that expansion of the same bellows will rotate the lever 66 in a direction to decrease the engine manifold pressure, or the engine fuel mixture supply, as shown in Figure 7. It is to be understood, moreover, that according to the invention the bellows 62 instead of being completely evacuated may contain a certain amount of gas, in which case the pressure within the bellows will increase with an increase of the surrounding temperature, causing expansion of the bellows. If bellows 62 is so arranged that the temperature thereof is substantially the same as the atmospheric temperature, or a desired engine operating temperature, the pressure regulator 60 will operate to vary the engine air supply, or fuel mixture supply, or manifold pressure as a predetermined function of the same temperature. Thus the regulator 60 may be so arranged as automatically to vary the engine air or combustible mixture supply or manifold pressure substantially as any desired function of such variables as the setting of control lever 80 and the pressure and temperature to which the bellows or equivalent pressure and temperature responsive means are subject.

In the form of the invention illustrated in Figure 5 the engine 135 is supplied with air or combustible mixture by way of a blower 136 through a duct 138, a carburetor 140 and a manifold 142. The engine 135 may include an additional conventional gear-driven supercharger, inserted for example between carburetor 140 and manifold 142, as indicated by numeral 101 in Figures 2, 4 and 5. The supercharger 136 is driven at variable speed by an exhaust turbine 144 connected by an exhaust manifold 146 with the cylinder exhaust ports. The flow of exhaust gases to the turbine nozzles is regulated by a valve or waste gate 148 actuated by lever 149. When the waste or blast gate 148 is in its extreme clockwise adjustment all exhaust gases from the engine will be delivered to the turbine, while with the gate 148 in its extreme counter-clockwise adjustment the exhaust gases discharge through the duct 150 and the turbine remains inoperative. At intermediate adjustments of the valve 148 more or less exhaust gases will be supplied to the turbine. It is thus clear that the speed of the supercharger 136 is dependent upon the adjustment of lever 149 just as the speed of the supercharger 10 of Figure 1 is dependent upon the adjustment of lever 33. A throttle valve 152, actuated by a lever 153, may be provided either on the discharge side of supercharger 136, as shown in Figure 5, or on the inlet side thereof. A stop 154 and a spring 155 connected with lever 153 tend to keep the throttle valve 152 in open position so as to secure automatically the operation of the throttle valve and supercharger in the desired sequence.

Levers 149 and 153 are connected with the ends of floating lever 44 of the regulator 60. Bellows 64 of the latter may be connected by means of a three-way cock 158 and ducts 159 and 160 either with duct 138, between the two superchargers, or with the engine manifold 142. The housing of the regulator 60, in which bellows 62 and 64 are contained is closed by a cover 162 and the pressure therein is kept equal to the exhaust pressure in the manifodl 146 by means of duct 163. Bellows 64 and 62 may have unequal diameters. With such arrangement the regulator 60 may be used for selectively controlling the induction pressure in either the first or the second stage of the supercharging system in dependence upon the adjustment of the control lever 80 and the exhaust pressure. In the case of Figure 5, wherein bellows 62 is shown as having larger effective section than bellows 64, for a given setting of the control lever 80 if the exhaust pressure decreases the bellows 62 expands, rotates the lever 66 clockwise about the pivot at its upper end, and causes displacement of the servo-motor 42 to the right, that is to say, in a direction either to open the throttle valve 152, or to close the blast gate 148, so as to increase the engine induction pressure.

It will be appreciated that, with the arrangement disclosed in connection with Figure 5, wherein the throttle valve 152 and the waste gate 148 are automatically operated in the stated sequence, the gas turbine 144 becomes effective only when the throttle valve 152 is substantially fully open. That is, whenever the engine operates within throttle valve capacity, the regulator 60 automatically holds the waste gate 148 in open position, thereby maintaining the exhaust pressure (and consequently also the exhaust temperature) at the lowest value, which of course is essential in order to secure best engine performance and maximum efficiency. The same regulator 60 does not initiate the closing of the waste gate 148 until the full throttle capacity is substantially attained or exceeded.

In the above described arrangements the regulator 60 automatically controls the engine induction pressure or density, and in turn any engine operative condition which is dependent thereon or is a function thereof, such as the engine air flow or air charge or the engine supply of combustible mixture, in dependence upon the setting of the control member 80 and, if so desired, also in predetermined relation to temperature, barometric pressure or exhaust pressure. Moreover, according to the invention, the regulator 60 may be used for the automatic regulation of an operative condition dependent for example upon the engine manifold pressure or the fuel mixture supply. To that end, the regulator may generally include a device responsive to variations of the operative condition, as stated, which it is desired to regulate automatically. Such a device is operatively connected with the servo-motor control valve of the regulator for actuating the latter to vary the engine supply of combustible mixture (for instance by operating the throttle valve and the supercharger control in the desired sequence) with changes of said operative condition. Resilient means may be provided to oppose the servo-motor actuating movement of said device, together with a manually operable control member for varying the amount of opposition exerted by said resilient means.

While specific mechanical and hydraulic embodiments have been illustrated for the purpose of disclosing the invention, it is to be understood that the invention is not limited to the arrangements so illustrated and described, but that such changes in the arrangement of the various parts and in the number, character and combination of the condition responsive means operatively connected ttherewith and in the manner of operation thereof may be resorted to as come within the scope of the apppended claims.

In interpreting these claims, where they are directed to less than all of the elements of the complete system disclosed, they are to be construed as covering possible uses of the recited elements in installations which lack the non-recited elements.

What I claim is:

1. A supercharging conditioning and control system for a propulsion powerplant having a plurality of main combustion engines each provided with an air intake; said system comprising: an air compressor, a combustion motor driving the compressor and having an air intake, conduit means connecting the discharge side of said compressor to the air intake of each of said engines and to the air intake of said motor, cooler means associated with said conduit means for removing compression heat, a throttle valve arranged in series with said compressor for controlling the pressure of the air supplied to said engines over a predetermined range of operation, additional valve means for controlling the motor variably to regulate the compression ratio of said compressor, a first automatic device including temperature sensing means for controlling said cooler means to regulate the temperature of the air supplied to said engines and motor, a second automatic device including pressure sensing means for controlling said throttle valve and said additional valve means, datum-varying means for said second automatic device, and a manually operable control member for operating said datum-varying means.

2. For a powerplant having a plurality of main combustion engines each provided with an air intake, an air supply and control system for delivering combustion air under controlled temperature and pressure conditions to the intakes of said engines, said system including an air inlet, an alternate inlet for air at temperature higher than atmospheric, first valve means controlling said alternate air inlet, a compressor, conduit means connecting said air inlet and alternate inlet to the intake side of said compressor, a heat exchanger connected with the discharge side of said compressor, second valve means controlling said heat exchanger, a first automatic device operatively connected to actuate said first and second valve means in predetermined sequence, a throttle valve in series with said compressor for regulating the flow of air therethrough, compression ratio control means for said compressor, a second automatic device operating on said throttle valve and compression ratio control means in predetermined sequence, and datum-varying means for said second automatic device.

3. A powerplant comprising a plurality of main combustion engines, an air compressor, a combustion motor driving said compressor, conduit means connecting the discharge side of said compressor with said engines and motor for supplying combustion air thereto, a first throttle valve controlling the air flow through the compressor, a second throttle valve regulating the air flow to said motor to control compressor operation, and an automatic device including pressure responsive means connected with a portion of said powerplant and operating to actuate said first and second throttle valves in predetermined reversible sequence.

4. A powerplant as set forth in claim 3, further including datum-varying means for said automatic device, a control member operable to select powerplant power output, and an operative connection between said control member and said datum-varying means.

5. A powerplant comprising a plurality of main combustion engines, an air compressor, a combustion motor driving said compressor, conduit means connecting the discharge side of said compressor to said engines and motor for supplying combustion air thereto, a heat exchanger associated with said conduit means, first valve means controlling said heat exchanger, an air intake for said compressor, an alternate intake for admitting air at temperature higher than atmospheric to said compressor, second valve means controlling said intakes, temperature responsive means connected to a portion of said powerplant to sense temperature variations therein, and motor means controlled by said temperature sensing means and operating on said first and second valve means in predetermined sequence to regulate the temperature of the air supplied to said main engines and to said motor.

6. Apparatus for controlling the pressure of the air supplied to the intake of a combustion engine, comprising in combination, a throttle, a compressor for supplying air to said engine, means for controlling the compression ratio of said compressor, a device responsive to the pressure in said intake normally operative in response to demand for increase of pressure in said intake first to position said throttle to its maximum air flow position and thereafter to operate said compression ratio controlling means toward its maximum air flow position, and additional means for varying the operating range of said compression ratio controlling means while still maintaining a substantially constant pressure in said intake.

7. In combination, an air-consuming engine, a plurality of regulating means for controlling the rate of air flow to the engine, motor means for positioning said regulating means, an automatic control device responsive to a force which is a measure of engine power output, and means for causing said control device to control said motor means to effect operation of said regulating means in predetermined sequence as the value of said force changes, and additional means operatively connected to actuate at least one of said regulating means to alter the operating range thereof.

8. The combination defined in claim 6, in which the additional means include a device responsive to variations in the speed of the compressor.

References Cited in the file of this patent

UNITED STATES PATENTS

| Number | Name | Date |
|---|---|---|
| 944,417 | Connet | Dec. 28, 1909 |
| 1,371,444 | Sherbondy | Mar. 15, 1921 |
| 1,508,707 | Moss | Sept. 16, 1924 |
| 1,655,683 | Standerwick | Jan. 10, 1928 |
| 1,816,737 | Moss | July 28, 1931 |
| 1,816,787 | Moss | July 28, 1931 |
| 2,013,138 | de Giers | Sept. 3, 1935 |
| 2,020,224 | Waseige | Nov. 5, 1935 |
| 2,079,069 | Johnson | May 4, 1937 |
| 2,082,397 | Hiscock | June 1, 1937 |
| 2,088,954 | Gregg | Aug. 3, 1937 |
| 2,148,230 | Berger | Feb. 21, 1939 |
| 2,187,737 | Gregory | Jan. 23, 1940 |
| 2,189,475 | Saur | Feb. 6, 1940 |
| 2,208,689 | Sulzman | July 23, 1940 |
| 2,216,699 | Berger | Oct. 1, 1940 |
| 2,217,364 | Halford et al. | Oct. 8, 1940 |
| 2,283,175 | Berger | May 19, 1942 |
| 2,285,344 | Marples et al. | June 2, 1942 |
| 2,297,235 | Müller | Sept. 29, 1942 |
| 2,305,810 | Müller | Dec. 22, 1942 |
| 2,345,464 | de Giers | Mar. 28, 1944 |
| 2,373,139 | Morris | Apr. 10, 1945 |
| 2,376,199 | Shoults | May 15, 1945 |
| 2,378,441 | Silvester | June 19, 1945 |
| 2,403,398 | Reggio | July 2, 1946 |
| 2,403,399 | Reggio | July 2, 1946 |
| 2,405,309 | Jorgensen et al. | Aug. 6, 1946 |
| 2,480,621 | Warner | Aug. 30, 1949 |
| 2,516,911 | Reggio | Aug. 1, 1950 |
| 2,560,210 | Browne | July 10, 1951 |
| 2,562,742 | Rowe et al. | July 31, 1951 |
| 2,581,334 | Reggio | Jan. 1, 1952 |

FOREIGN PATENTS

| Number | Country | Date |
|---|---|---|
| 477,941 | Germany | June 15, 1929 |
| 479,278 | Great Britain | Jan. 28, 1938 |